Figures 1, 2:
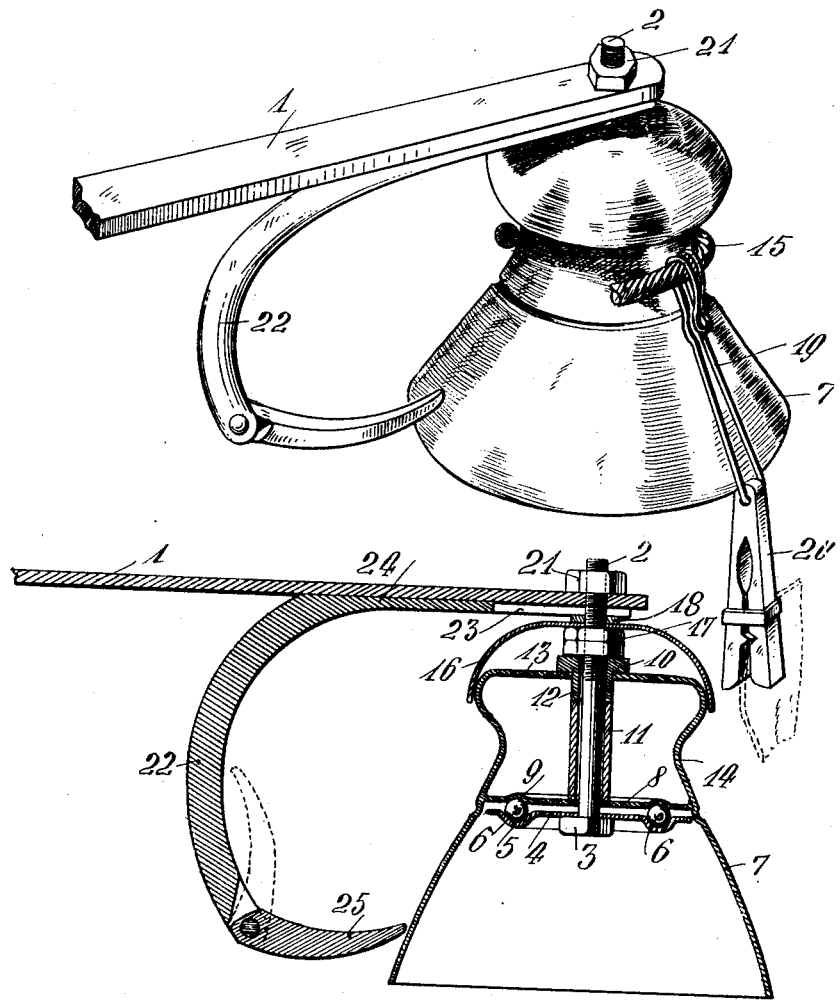

J. UBL.
CLOTHES DRIER.
APPLICATION FILED MAR. 7, 1914.

1,106,993.

Patented Aug. 11, 1914.

WITNESSES:

INVENTOR.
John Ubl.
BY
ATTORNEY.

UNITED STATES PATENT OFFICE.

JOHN UBL, OF NEW YORK, N. Y.

CLOTHES-DRIER.

1,106,993.  Specification of Letters Patent.  Patented Aug. 11, 1914.

Application filed March 7, 1914. Serial No. 823,196.

*To all whom it may concern:*

Be it known that I, JOHN UBL, a citizen of the United States, residing at New York, in the county of New York and State of New York, have invented new and useful Improvements in Clothes-Driers, of which the following is a specification.

My invention relates to a clothes drier, designed more especially as an improvement over patent numbered 797,242, issued jointly to myself and Paul Voydiseck.

The principal object of my invention is to strengthen and simplify the arrangement shown and described in the patent just mentioned.

The second object of my invention is to provide simple and reliable means for preventing the ropes from dropping off of the device.

A final object of my invention resides in the particular arrangement and combination of parts hereinafter described.

In the accompanying drawing:—Figure 1 is a perspective view of my improved device. Fig. 2 is a vertical sectional view through the center of the device shown in Fig. 1.

Referring more particularly to the drawing, 1 is an arm or support which may be mounted in any convenient situation and which is apertured at its outer end to receive a threaded bolt such as 2. The bolt 2 extends downwardly beneath the arm 1 as indicated in Fig. 2 and has a head 3. Carried by the head 3 is an apertured plate 4 which is provided with an upwardly opening groove 5 forming a race for the balls such as 6. Supported by the balls 6 is an inverted bell shaped member 7 which has a partition 8 provided with a groove 9 which receives the upper portion of the ball 6. The upper portion of the bell 7 is extended upwardly and surrounds the bolt 2 so that the upper end of the bell member is guided by the bolt. An unusual strain is placed thereon as indicated at 10. However, I find that very little stress occurs at the point 10 the weight and stress being taken almost entirely by the ball 6. I may also insert a sleeve such as 11 intermediate the partition 8 and the part 12 which depends from the top 13 of the member 7. The upper portion of the member 7 is indented as indicated at 14 to form a groove for a rope such as 15, and I provide a shield 16 which will prevent the rain from running down the top of the member 7 into the interior of the bell 14.

The shield 16 is held between two jam members such as 17—17 and a nut 18, the shield being apertured and fits over the bolt 2.

Now it will be understood that while I show only one of the members such as 7, that a second revoluble member is mounted in any convenient location so that the rope 15 may run around the two. Hooks such as 19 are used from which depend suitable pins such as 20 by which the clothes may be fastened. In this way both sides of the rope 15 may be used to hang clothes on as the hooks 19 pass readily around the bell member 7 when the rope is pulled in either direction.

It will be seen that the bolt 2 is held in place by a nut 21 which rests against the upper face of the arm 1, and I have provided a curved arm 22, the upper end of which is slotted as indicated at 23 and which is placed so that the bolt 2 passes through the slot. The upper face of the member 22 is flattened as indicated at 24 so as to bear firmly against the under face of the arm 1. It will be seen from the foregoing that when the member 22 is placed so that the bolt passes through the slot 23, that by tightening the nut 21, member 22 is fastened firmly against the under face of the arm 1 and securely held thereagainst by contact with the nut 18 previously mentioned. The arm 22 extends outwardly and downwardly and is then curved inwardly again toward the bell 7 so that its lower end is nearly on the same level with the lower edge of the bell.

Pivoted at the lower end of the arm 22 is a finger 25 which normally falls downwardly of its own weight and extends out toward the bell almost into contact therewith. Consequently if, for any reason, the rope 15 should be slackened by stretching due to rain or any other unusual condition, the finger 25 will prevent it from slipping off of the bell. However, the finger may be raised when so desired in order to put the rope on the bell or to take it off. It will be seen that the lower end of the arm 22 and the pivoted end of the finger are so formed that the finger will not fall below the position shown in Figs. 2 and 3.

It will be understood that while I have shown and described the preferred form of my invention, that I do not wish to be limited to the details shown except as to such features as are clearly included in the appended claims.

Having thus described my invention, what I claim is:—

1. In a device of the class described in combination, a rotatable mounted bell, a support for said bell, an arm mounted adjacent said bell, and a finger pivoted to said arm, said arm and finger being so arranged as to normally prevent the rope from dropping off said bell.

2. In a device of the class described in combination, a support, a bolt depending therefrom, a disk or plate carried by the head of said bolt and having a groove therein, balls mounted in said groove, and an inverted bell-like member provided with a partition having a groove fitted over said ball, said bell-like member being extended upwardly and around said bolt.

3. In a device of the class described in combination, a support, a bolt depending therefrom, a disk or plate carried by the head of said bolt and having a groove therein, balls mounted in said groove, and an inverted bell-like member provided with a partition having a groove fitted over said balls, said bell-like member being extended upwardly and around said bolt and having an external groove intermediate the level of said partition and the top thereof for receiving a rope.

4. In a device of the class described in combination, a support, a bolt depending from said support, a bell-like member rotatably mounted on said bolt, a nut carried by said bolt above said member, a rain shield carried by said bolt above said nut, a second nut above said shield, an arm secured intermediate said last mentioned nut and said support, and a nut above said support for holding the previously mentioned members in position.

In testimony whereof I affix my signature in the presence of two witnesses.

JOHN UBL.

Witnesses:
ALEXANDER DENES,
AHADIER HAMBURGER.

---

Copies of this patent may be obtained for five cents each, by addressing the "Commissioner of Patents, Washington, D. C."